UNITED STATES PATENT OFFICE.

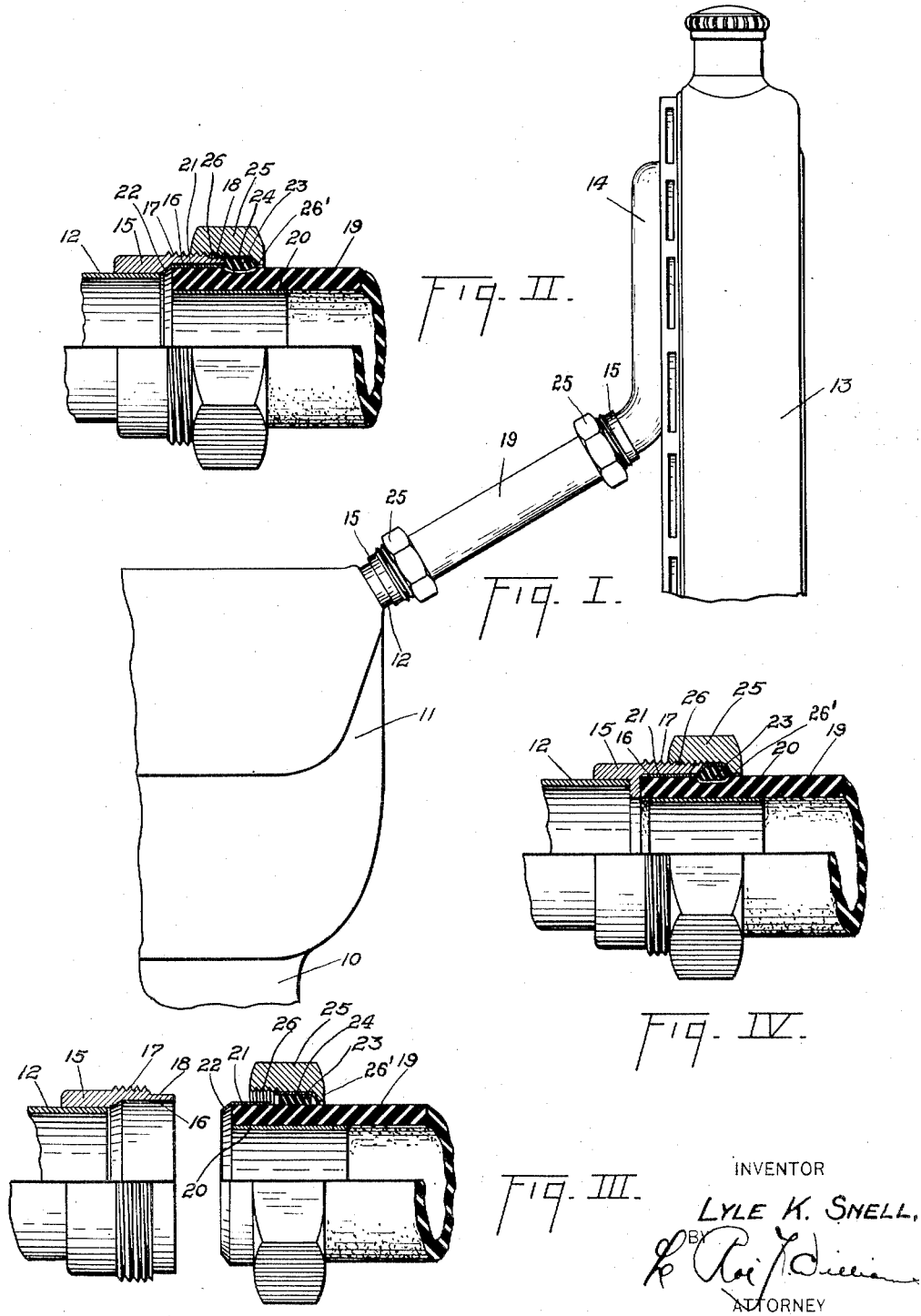

LYLE K. SNELL, OF DETROIT, MICHIGAN, ASSIGNOR TO CADILLAC MOTOR CAR COMPANY, OF DETROIT, MICHIGAN, A CORPORATION OF MICHIGAN.

COMPRESSION-COUPLING.

1,334,682.  Specification of Letters Patent.  Patented Mar. 23, 1920.

Application filed October 1, 1917. Serial No. 194,260.

*To all whom it may concern:*

Be it known that I, LYLE K. SNELL, a citizen of the United States, and resident of Detroit, Wayne county, State of Michigan, have invented certain new and useful Improvements in Compression-Couplings, of which the following is a specification.

This invention relates to improvements in hydrocarbon motors and more particularly to the couplings as applied to hydrocarbon motor water circulating systems.

It is common practice in connecting the water jacket of a hydrocarbon motor with the radiator, or in connecting other parts of the water circulating system such as the pump or bypass connections, to use a flexible hose in order that the vibrations of the several parts will not strain any joints or connections and thus cause leaks, and such hose connections are customarily made by fitting a hose length, of sufficiently large diameter, over the ends of the pipes or parts to be connected and then clamping the hose, onto the part over which it is fitted, by means of a wire, or a clamping band, having the ends thereof upturned to receive a bolt and nut for drawing the same together. Such connections, however, do not make a neat appearance and frequently where the clamp is pinched together by the bolt, it will pinch the hose at that point in the periphery thereof, to cause an opening between it and the part it is clamped around so that water leaks from the system. This is especially liable to occur after a hose has been in use for some time and has become slightly enlarged as occurs when it has been removed for any reason.

There are times when it is desired to remove a hose connection that it is difficult to separate the hose from the metal to which it is clamped as the heat of the water circulating about the system in time will vulcanize the rubber hose to the metal. It is also usually found troublesome to make a proper joint between the hose and the end of a pipe or connection, if there has been occasion to remove the hose a sufficient number of times to fray or separate the several layers, comprising the hose, at the end where the connection is to be made.

One of the objects of this invention is to devise a hydrocarbon motor of neat appearance, including a water circulating system.

Another object of this invention is to devise a hydrocarbon motor having the several connections pertaining to the water circulating system readily detachable and of durable construction for replacement.

Another object of this invention is to devise a hydrocarbon motor which shall require a minimum diameter of hose for connections throughout the water circulating system.

Another object of this invention is to devise a hydrocarbon motor in which the several joints such as those about the hose as used in the water circulating system, may readily be made leakproof.

These, and other objects, will more clearly appear from the following description taken in connection with the accompanying drawings which form a part of this specification and in which:

Figure 1 is a fragmentary view of a portion of a hydrocarbon motor and hose connections coupling the same to a radiator.

Fig. 2 is an enlarged side elevation of the preferred form of hose coupling showing the upper half thereof in section.

Fig. 3 is an enlarged side elevation of the coupling as shown in Fig. 2, with the parts thereof separated in readiness to be coupled.

Fig. 4 is an enlarged side elevation of a slightly modified form of coupling showing the upper half thereof in section.

Referring to the drawings, 10 is a portion of a hydrocarbon motor having the water jacket 11 surrounding the cylinders thereof as customary and the water outlet pipe 12 extending from the upper corner thereof.

The water circulating system of the hydrocarbon motor as illustrated includes a radiator 13 as customary, having the inlet pipe 14 connected with the upper end thereof.

The outlet end of the pipe 12 and inlet end of the pipe 14 are each fitted with a coupling member 15 permanently secured thereto as by brazing or soldering, the coupling member projecting beyond the end of the pipe and having the inner periphery thereof enlarged as at 16 and the outer periphery threaded at 17 for a portion of its length, leaving the plain surfaced reduced end 18.

The couplings 15 are connected one to the other by a length of hose 19 each end of which extends into the enlarged inner end of a coupling 15 and has a metallic bushing 20 fitted around the interior thereof and the metallic band 21 fitted around the exterior surface, said band 21 having the end 22 tapered inwardly to conform to the interior shape of the coupling 15.

A compressible collar 23 is arranged around each end of the hose next to the band 21 and having a metallic band 24 encircling the same and within a sleeve member 25, preferably formed with a hexagonal outer periphery and the threaded inner periphery 26 screwing onto the threaded portion 17 of the coupling 15 whereby as the said sleeve is tightened onto the coupling 15, the collar 23 will be forced inwardly, as shown in Fig. 2, between the inwardly extending end 26' of said sleeve and the plain end 18 of the coupling 15, thus compressing the hose about the bushing 20 and forming a true and tight joint.

It will be noticed that the plain outer end 18 of the coupling 15 enters the sleeve 25 and fits inside the metallic band 24 about the compressible collar 23 and this rubber to metal joint is easily made tight as the sleeve 25 may readily be turned on the metallic band 24 to tighten the joint.

When it is desired to disconnect the hose, the sleeve 25 may be readily loosened by turning the same around on the metallic band 24 and the end of the hose, having the metallic band 21 sheathing the end thereof, may be readily withdrawn from the pipe, or again inserted to make the joint as desired.

In the modification shown in Fig. 4, the band 21 sheathing the end of the hose is flared outwardly and over the compressible collar 23, the band preferably being made of copper or a similar metal which will readily conform to the inner shape of the sleeve 25 and the hose grooved to receive the compressible collar which is thus forced inwardly to make a tight joint about the hose. In this modification, the one sleeve will make a tight joint and after the joint has once been made, the band will form a complete sheathing for the end of the hose and the compressible collar, and serve as a gasket so that the hose may be readily separated from the pipe or connected thereto as desired.

While I have described and will specifically claim what I deem to be a preferred embodiment of my invention, it will be obvious to those skilled in the art that various modifications and changes may be made without departing from the spirit and scope hereof.

Having thus described my invention, what I claim and desire to secure by Letters Patent is:

1. In a coupling of the class described and in combination with a comparatively soft and yieldable conduit the end of which is to be connected with another conduit, a metallic tubular bushing located within the end of said conduit; a metallic band of less length than said bushing surrounding the end of said conduit; a comparatively soft and compressible collar surrounding said yieldable conduit and located between the ends of said bushing so that force due to the compression of said collar is resisted by said bushing; an exteriorly threaded metallic coupling member into which the end of said yieldable conduit extends; and an interiorly threaded metallic clamping sleeve in threaded engagement with the threaded portion of said coupling and having an inwardly extending ledge adapted to engage said compressible collar and force the same against said conduit and the end of said metallic coupling.

2. In a coupling of the class described and in combination with a comparatively soft and yieldable conduit the end of which is to be connected with another conduit, a metallic tubular bushing located within the end of said conduit; a metallic band of less length than said bushing surrounding the end of said conduit; a comparatively soft and compressible collar surrounding said yieldable conduit and located between the ends of said bushing so that force due to the compression of said collar is resisted by said bushing; an exteriorly threaded metallic coupling member into which the end of said yieldable conduit extends; an interiorly threaded metallic clamping sleeve in threaded engagement with the threaded portion of said coupling and having an inwardly extending ledge adapted to engage said compressible collar and force the same against said conduit and the end of said metallic coupling; and a metallic band encircling said compressible collar and lying between the periphery thereof and the inner surface of said clamping sleeve.

3. In a coupling of the class described and in combination with a comparatively soft and yieldable conduit the end of which is to be connected with another conduit, a metallic tubular bushing located within the end of said conduit; a comparatively soft and compressible collar surrounding said yieldable conduit and located over said bushing so that force due to the compression of said collar is resisted by said bushing; an exteriorly threaded metallic coupling member into which the end of said yieldable conduit extends; an interiorly threaded clamping sleeve in threaded engagement with the threaded portion of said coupling and having an inwardly extending ledge adapted to engage said compressible collar and force the same against said conduit and the end of said metallic coupling; and a metallic band encircling said compressible collar and lying between the periphery thereof and the inner surface of said clamping sleeve, and which band extends into said metallic coupling between the interior thereof and the exterior surface of said yieldable conduit.

In testimony whereof I affix my signature.

LYLE K. SNELL.